April 9, 1929.    O. R. WINKLER    1,708,344

TENSION CONTROL

Filed Sept. 1, 1926

INVENTOR.

Orville Ray Winkler

Patented Apr. 9, 1929.

1,708,344

UNITED STATES PATENT OFFICE.

ORVILLE R. WINKLER, OF LOS ANGELES, CALIFORNIA.

TENSION CONTROL.

Application filed September 1, 1926. Serial No. 133,019.

My invention has for its principal object the provision of a brake for printing machines whereby a more perfect application of the brake is secured between the brake shoes and the brake drum, as per example, in the well known rotary web type, to which my invention is particularly adapted and at the same time maintaining suitable lubrication and minimum of wear.

Elaborating on the principal object as defined, a smoother and more uniform tension on the web is obtained and it will hold a truer margin than existing types of brakes which feature makes possible its use on duplex machines for color work as well as improving this feature on other types of machines.

There is no tending to grab between the friction surfaces when tightening the brakes in obtaining tension in the web and on account of the lubricating means, slippage will be had; whereas on other types of the present day a "hot box" might occur.

Referring to the drawing the invention will be made clear.

Figure 1:
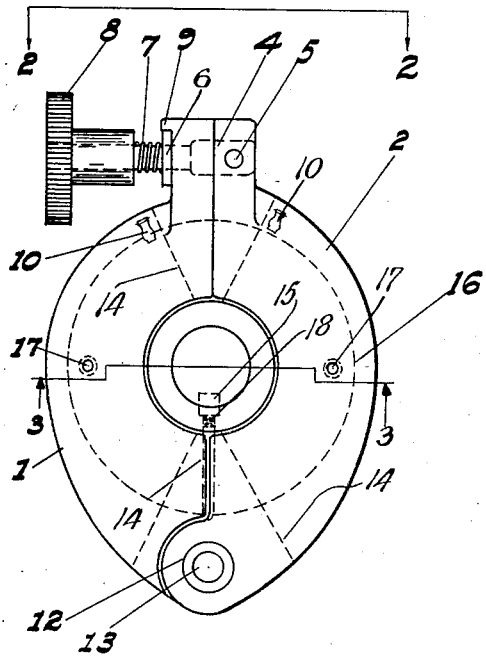
Figure 1 is a side view and Fig. 2 is a front view taken on the line 2—2 of Fig. 1.

Similar references of nomenclature are used throughout the several views.

Reference being had to the drawings; 1 and 2 are clamping shoes hingedly mounted to a threaded shaft 3 which is carried in the main frame of the machine. The machine is not shown here since it is not considered essential in portraying the principles of applicant's invention.

The portions of this shaft designated by the numerals 11 and 13 and having a hub 12 are carried by bearings situated in the main frame of the web machine and upon which the tension control is adapted to be adjusted longitudinally on the threaded portion of the shaft 3 thereby moving the roll of paper therewith and maintaining a perfect margin. It is to be understood that the shaft 19 is the usual paper-roll supporting shaft and that it is to be supported in a well known manner (not shown) for longitudinal adjustment. Hence manual rotation of the shaft end 13 horizontally adjusts my tension control together with the shaft 19 to which said control is secured.

On duplex machines now in use my device is very adaptable for color work and is the only contrivance which has been produced which will faultlessly render a proper margin.

Figure 4:
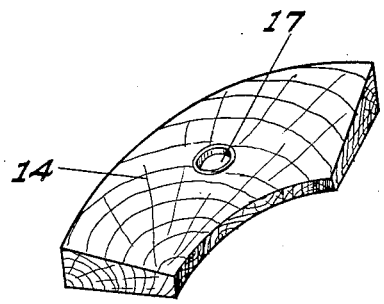
Fig. 4 is a perspective view of one of the clamping shoe liners or friction segments.

On the inside tapered faces of said clamping shoes are fastened friction segments 14 perspectively shown in Fig. 4.

These friction segments are fastened to the clamping shoes by flat head machine screws, a countersunk hole 17 being provided for in the segments for that purpose.

The flat head screws are well grounded in the segment to permit wear on all the faces thereof.

Figure 3:
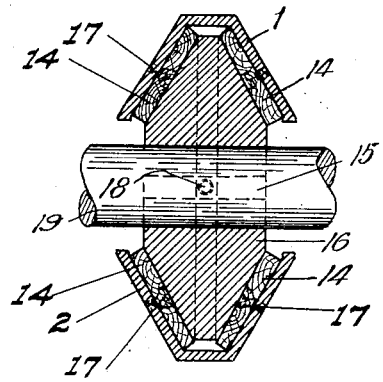
Fig. 3 is a section taken on the line 3—3 of Fig. 1.
Figure 2:
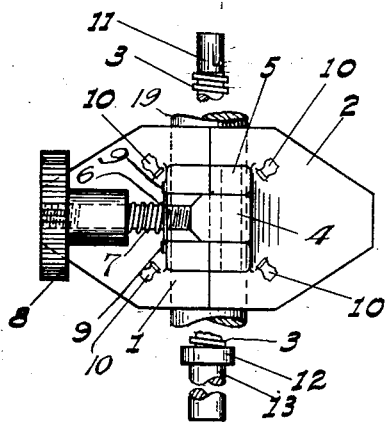

A brake drum 16 is keyed to the shaft 19 by a key 15 (see Fig. 3) and held in place by a set screw 18.

The brake drum is designed to permit of rough usage, when being tossed about or rolled over the floor and contrasted with the shape of the present ones now in use which are easily broken, I find my new device also more popular in shafting up paper and in unshafting cores.

A lug 9 which is another feature of my invention is provided for on the lip of clamping shoe 1, as shown in Fig. 1 to prevent the washer 6 from slipping off the lip caused from the vibration of the web roll machine.

The spring 7 may be de-compressed sufficiently to permit the clamping bolt 4 to be swung around pin 5 as a pivot thus allowing both shoes 1 and 2 to be swung about their pivotal axis on the shaft 3 and thereby releasing them from the brake drum 16.

A knurled nut 8 adjustable upon the bolt 4 is used in conjunction with the spring 7 to yieldably clamp the brake shoes containing the friction segments relative to the brake drum with sufficient pressure to keep the web on the web roll (not shown) taut.

It is prevented from rotating with the bolt 4 about the pin 5 as an axis by a washer 6 encircling the bolt 4, and further restrained by the contact of the washer 6 with the lugs 9 on the lip of the clamping shoe 1.

The friction segments 14 are impregnated by soaking in oil or any suitable lubricant before being applied to the clamping shoes and after being applied their lubrication is provided for by oil ports 10 situated in both clamping shoes.

The heat produced by the friction at the juncture of the faces of the brake drum and the friction segments augments adhesion there between which is overcome by the seepage of the oil from the friction segments when the clamping shoes are drawn relative to the face of the drum.

This eliminates any jerking or binding which might be termed a "hot box" and which causes breakage of the paper which defect is noticeable in brake shoes now in use.

In web roll machines using a continuous sheet of paper one can readily see how necessary it is to maintain a uniform margin as well as keeping the paper taut. In case there is any tendency of the brakes used in a tension control to grab, the tenacity of the paper is oftentimes insufficient to overcome the additional strain imposed upon it and when this occurs the web is consequently ripped asunder.

Of the feature I have endeavored to elaborate upon and this feature lies within the tangential pressure obtained between the lubricated friction segment and the brake drum and the means of maintaining a lubricating means at their juncture, thereby eliminating at all times any possibility whatsoever of the contacting surfaces to grab.

Having thus described my invention, what I claim to be an improvement and desire to secure Letters Patent of the United States on is:

In combination, a brake drum, the peripheral surface of which is substantially V-shaped, a pair of brake shoes having substantially V-shaped interior surfaces pivotally joined together and containing friction liners which are impregnated with a lubricant and are adapted to frictionally contact with the V-shaped surfaces of aforesaid brake drum, yieldable clamping means for contacting said brake shoes relative to said brake drum, comprising a screw threaded eye bolt pivotally mounted to one of said brake shoes and adapted to be contained within a slot in its companion shoe, a washer and a spring mounted about of said eye bolt, and a knurled nut mounted on said eye bolt for yieldably tightening aforesaid brake shoes relative to the drum, lugs fastened to one of said brake shoes whereby to hold said yieldable means intact, oil ports contained in said brake shoes, the tightening said brake shoes relative to the drum lubricating through the medium of said friction segments the surface of the drum.

ORVILLE R. WINKLER.